US008616580B2

(12) United States Patent
Maniwa et al.

(10) Patent No.: US 8,616,580 B2
(45) Date of Patent: Dec. 31, 2013

(54) STEERING APPARATUS (75) Inventors: Takahiro Maniwa, Gunma-ken (JP); Norihiko Yokota, Gunma-ken (JP)

(73) Assignee: Yamada Manufacturing Co., Ltd., Kiryu-Shi, Gunma-Ken (JP)

(*) Notice: Subject to any disclaimer, the term of this patent is extended or adjusted under 35 U.S.C. 154(b) by 0 days.

(21) Appl. No.: 13/426,540

(22) Filed: Mar. 21, 2012

(65) Prior Publication Data
US 2012/0248752 A1  Oct. 4, 2012

(30) Foreign Application Priority Data

Mar. 28, 2011  (JP) .................................. 2011-69277

(51) Int. Cl.
*B62D 1/18* (2006.01)
*B62D 1/185* (2006.01)
*B62D 1/19* (2006.01)

(52) U.S. Cl.
USPC .............................. 280/779; 280/775; 74/493

(58) Field of Classification Search
USPC ..................................... 280/775, 779; 74/493
See application file for complete search history.

(56) References Cited

U.S. PATENT DOCUMENTS

| 5,009,121 | A  | * | 4/1991 | Matsumoto et al. | 74/493 |
| 6,530,599 | B1 | * | 3/2003 | Oka | 280/777 |
| 7,228,754 | B2 | * | 6/2007 | Matsumiya | 74/493 |
| 7,413,222 | B2 | * | 8/2008 | Higashino et al. | 280/775 |
| 7,455,321 | B2 | * | 11/2008 | Menjak et al. | 280/777 |
| 7,506,893 | B2 | * | 3/2009 | Higashino et al. | 280/776 |
| 8,127,639 | B2 | * | 3/2012 | Manwaring et al. | 74/492 |
| 2006/0214410 | A1 | * | 9/2006 | Sawada et al. | 280/775 |
| 2007/0137379 | A1 | * | 6/2007 | Sanji et al. | 74/493 |

FOREIGN PATENT DOCUMENTS

JP    2005-335491 A    12/2005

* cited by examiner

*Primary Examiner* — Ruth Ilan
*Assistant Examiner* — Darlene P Condra
(74) *Attorney, Agent, or Firm* — McGinn IP Law Group, PLLC (57) ABSTRACT A steering apparatus has a steering shaft 7, an inner column 2 that supports the steering shaft 7 via a bearing 81, an outer column A that embraces the inner column 2, a fixing bracket 1 that sandwiches the outer column A from both sides in a width direction, and a tightener 6 that tightens and releases the outer column A together with the fixing bracket 1. The inner column 2 has an embraced cylindrical section 21 that is embraced by the outer column A. A relief section 212 having an outer diameter that is formed smaller than other portions of the embraced cylindrical section 21 is formed in a middle region of the embraced cylindrical section 21 in an axial direction, and the bearing 81 that pivotally supports the steering shaft 7 is fixed to an inner circumferential side of the relief section 212.

16 Claims, 6 Drawing Sheets

FRAGEMENTARY VIEW Y1—Y1

Fig.1C

FRAGEMENTARY VIEW Y2—Y2

Fig.4B
ENLARGED VIEW OF PORTION (β)
BEFORE DEFORMATION

Fig.4C
ENLARGED VIEW OF PORTION (β)
AFTER DEFORMATION

STEERING APPARATUS

BACKGROUND OF THE INVENTION

1. Field of the Invention

The present invention relates to a steering apparatus which has a tilt-and-telescopic adjustment mechanism and which is capable of preventing shape distortion of a bearing from an inner column due to tightening during tilt-and-telescopic adjustment and securing both telescopic travel of the inner column and tightening retention.

2. Description of the Related Art

In recent years, many so-called short column-type steering apparatuses with shorter axial distances from a steering shaft to an upper universal joint have become available. With such a short column-type steering apparatus, an outer column has a shorter length in an axial direction and an upper universal joint moves together with an inner column in an axial direction during telescopic adjustment. Related art Japanese Patent Application Laid-open No. 2005-335491 discloses a short column-type steering apparatus having a tightening structure with high stiffness. An outer diameter section of an inner column 1 is configured such that an outer diameter of the outer diameter section decreases in stages from front to rear of a vehicle body to form an large outer diameter section 16A, a medium outer diameter section 16B, and a small outer diameter section 16C (refer to FIG. 6 of Japanese Patent Application Laid-open No. 2005-335491).

An inner diameter of the large outer diameter section 16A of the inner column 1 is formed in a dimension that enables the large outer diameter section 16A to enclose, but not interfere with, an upper universal joint 71. An inner diameter section of an outer column 3 is configured such that an inner diameter of the inner diameter section decreases in stages from the front to the rear of the vehicle body to form an large inner diameter hole 33A and a medium inner diameter hole 33B (refer to FIG. 7 of Japanese Patent Application Laid-open No. 2005-335491). The large outer diameter section 16A of the inner column 1 is guided by the large inner diameter hole 33A and the medium outer diameter section 16B of the inner column 1 is guided by the medium inner diameter hole 33B and, accordingly, the cylindrical inner column 1 is supported so as to be telescopically movable in an axial direction of the outer column 3.

At a maximum telescopic position (refer to reference numeral (1) in FIG. 9 of Japanese Patent Application Laid-open No. 2005-335491) to which the inner column 1 has been pulled out by a maximum distance toward a driver and a middle telescopic position (refer to reference numeral (2) in FIG. 9 of Japanese Patent Application Laid-open No. 2005-335491), the upper universal joint 71 penetrates into the outer column 3. Therefore, even with a short column having a shorter distance to the upper universal joint 71, a long telescopic stroke of the inner column 1 can be secured. At this point, since the large outer diameter section 16A that encloses the upper universal joint 71 is guided by the large inner diameter hole 33A, a guide length S1 at the maximum telescopic position and a guide length S2 at the middle telescopic position are secured.

In a vicinity of a minimum telescopic position (refer to reference numeral (3) in FIG. 9 of Japanese Patent Application Laid-open No. 2005-335491) to which the inner column 1 has been pushed in by a maximum distance toward the front of the vehicle body, the large outer diameter section 16A that encloses the upper universal joint 71 detaches from the large inner diameter hole 33A of the outer column 3 and only the medium outer diameter section 16B is guided by the medium inner diameter hole 33B of the outer column 3. Therefore, a guide length S3 of the inner column 1 at the minimum telescopic position is a minimum guide length.

Furthermore, a protrusion 15 is integrally formed above the large outer diameter section 16A of the inner column 1 (refer to FIG. 8 of Japanese Patent Application Laid-open No. 2005-335491), and a guide groove 34 that guides the protrusion 15 is formed on the outer column 3 over an entire length of the telescopic stroke of the inner column 1 (refer to FIG. 5 of Japanese Patent Application Laid-open No. 2005-335491). Due to the protrusion 15 and the guide groove 34 abutting each other at the minimum telescopic position, a guide length S4 of the inner column 1 is extended and transverse slip due to a gap at a fitting section is resolved (refer to FIG. 7 of Japanese Patent Application Laid-open No. 2005-335491).

Figure 6A:
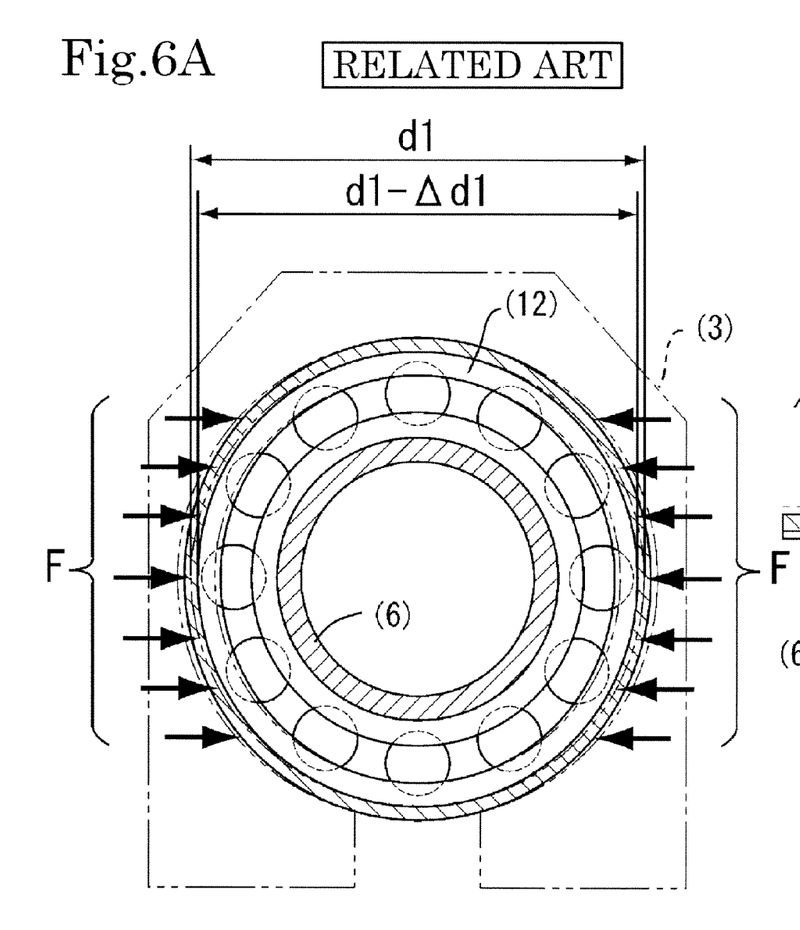
FIG. 6A is a schematic front view showing an operation according to related art.
Figure 6B:
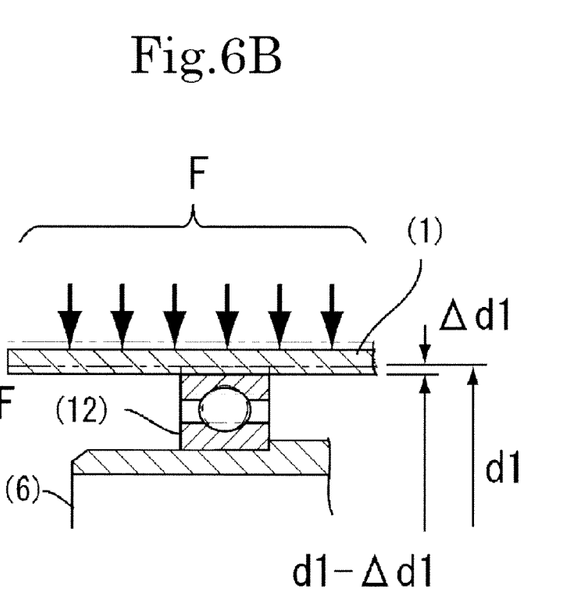
FIG. 6B is a state diagram showing a state in which a bearing is pressed during tightening.

However, Japanese Patent Application Laid-open No. 2005-335491 entails the following problems. First, an upper steering shaft 6 is rotatably supported by an upper bearing 11 and a lower bearing 12 in the inner diameter section 13 of the inner column 1. The lower bearing 12 is arranged on an inner circumference of the medium outer diameter section 16B, and when the medium outer diameter section 16B is pressed by the outer column 3 during clamping, the lower bearing 12 may become distorted. Distortion of the lower bearing 12 destabilizes the rotatable support of the steering shaft 6. Such a phenomenon will now be described with reference to a schematic view (FIG. 6). Moreover, only for FIG. 6 which illustrates related art, reference numerals will be parenthesized in order to distinguish FIG. 6 from the present invention.

When the outer column 3 is tightened, a pressing force F causes an outer diameter d1 of the inner column 1 to contract by a minute dimension $\Delta d1$ and the inner column 1 deforms elliptically. As a result, the outer diameter changes to $d1-\Delta d1$ (refer to FIG. 6A). The effect of the deformation of the inner column 1 extends to the lower bearing 12 via the inner column 1. Consequently, an outer wheel of the lower bearing 12 is pressed and deforms elliptically, and the lower bearing 12 becomes no longer capable of providing rotational movement in a smooth manner (refer to FIG. 6B).

In addition, the large outer diameter section 16A that encloses the upper universal joint 71 of the inner column 1 is structured so as to move in an axial direction inside the large inner diameter hole 33A of the outer column 3. Therefore, extending the length of the large inner diameter hole 33A in order to secure telescopic stroke within the limited length of the outer column 3 in the axial direction results in shortening a length of the medium inner diameter hole 33B of the outer column 3 which embraces and fixes the inner column 1, and destabilizes clamp retention. Conversely, extending the length of the medium inner diameter hole 33B in order to increase clamp retention shortens the length of the large inner diameter hole 33A and prevents a long telescopic stroke from being obtained.

Furthermore, since the large outer diameter section 16A that encloses the upper universal joint 71 of the inner column 1 and the large inner diameter hole 33A of the outer column 3, and the medium outer diameter section 16B of the inner column 1 and the medium inner diameter hole 33B of the outer column 3, are respectively formed so as to correspond to each other, dimension management is difficult. If dimensions of the large outer diameter section 16A and the large inner diameter hole 33A do not correspond to each other, telescopic travel cannot be performed in a smooth manner. On the other hand, if dimensions of the medium outer diameter section 16B and the medium inner diameter hole 33B do not correspond to each other, clamp retention becomes unstable. As described above, the formation of two different outer diameters and inner diameters on the inner column 1 and the outer column 3 makes dimension management difficult and increases cost.

SUMMARY OF THE INVENTION

At the minimum telescopic position (refer to reference numeral (3) in FIG. 9 of Japanese Patent Application Laid-open No. 2005-335491), since the large outer diameter section 16A detaches from the large inner diameter hole 33A of the outer column 3 and only the medium outer diameter section 16B is guided by the medium inner diameter hole 33B of the outer column 3, clamp retention becomes unstable. Therefore, since a structure must be introduced for stabilizing retention of the inner column 1 by providing the protrusion 15 on the large outer diameter section 16A of the inner column 1 which has detached from the clamp retention of the outer column 3 and providing the guide groove 34 on the outer column 3 in correspondence to the protrusion 15, cost increases. An object (technical problem to be solved) of the present invention is to prevent shape distortion of a bearing from an inner column due to tightening during tilt-and-telescopic adjustment and to sufficiently secure both telescopic travel of the inner column and tightening retention.

Accordingly, after intensive research, the present inventor has achieved the above object by configuring a first invention as a steering apparatus having: a steering shaft which is formed of a shaft section and a yoke section; an inner column which supports the steering shaft via a bearing; an outer column which embraces the inner column and which has an embracing inner circumferential surface with a same diameter along an axial direction; a fixing bracket which has fixing side sections sandwiching both sides of the outer column in a width direction; and a tightener which tightens and releases the outer column together with the fixing bracket, wherein the inner column has an embraced cylindrical section that is embraced by the outer column, a relief section having an outer diameter formed smaller than other portions of the embraced cylindrical section is formed in a middle region in the axial direction of the embraced cylindrical section, and the bearing that pivotally supports the steering shaft is fixed to an inner circumferential side of the relief section.

The above object is also achieved by configuring a second invention as the steering apparatus according to the first invention, wherein both sides of the relief section in the axial direction are arranged as conical slopes. The above object is also achieved by configuring a third invention as the steering apparatus according to the first or second invention, wherein the relief section is formed at a position of the embraced cylindrical section toward the front in the axial direction, and the front of the relief section in the axial direction constitutes a yoke housing cylindrical section that houses the yoke section of the steering shaft.

The above object is also achieved by configuring a fourth invention as the steering apparatus according to any one of the first to third inventions, wherein a telescoping-enabling long hole is formed in the embraced cylindrical section, and a knock pin that protrudes from the embracing inner circumferential surface is mounted on the outer column and inserted into the telescoping-enabling long hole.

In the first invention, an embraced cylindrical section that is embraced by an embracing inner circumferential surface of an outer column is formed on an inner column. A relief section that has a smaller outer diameter than other portions is formed in the embraced cylindrical section, and a pressing force due to tightening from the outer column does not extend to the relief section and only extends to other portions of the embraced cylindrical section. Since the pressing force due to tightening from the outer column does not act on a bearing which is fixed on an inner circumferential side of the relief section and which supports a steering shaft, deformation and distortion of the bearing does not occur. Therefore, a smooth rotation of the bearing can be maintained in a state where tightening is provided by a tightener and a favorable rotational movement of the steering shaft can be produced.

In addition, the embracing inner circumferential surface of the outer column is formed so as to have a same diameter along the axial direction, and the embraced cylindrical section of the inner column is formed so as to have the same outer diameter with the exception of the relief section. Accordingly, an entire length of the embracing inner circumferential surface of the outer column in the axial direction can be arranged as a sliding surface and a tightening retention surface of the embraced cylindrical section of the inner column, and telescopic travel and tightening retention by the outer column can be sufficiently secured. Furthermore, dimension management of the outer diameter of the embraced cylindrical section of the inner column and the embracing inner circumferential surface of the outer column can be performed more easily and various parts can be favorably manufactured and assembled.

In the second invention, by arranging both sides of the relief section in the axial direction as conical slope sections, the conical slopes absorb distortion due to deformation caused by tightening of the embracing inner circumferential surface of the outer column and the effect of a pressing force due to tightening from the outer column can be minimized. In the third invention, by adopting a configuration in which the relief section is formed at a position in the embraced cylindrical section toward the front in the axial direction and the front of the relief section in the axial direction constitutes a yoke housing cylindrical section that houses the yoke section of the steering shaft, a length of the embraced cylindrical section in the axial direction can be extended to the yoke section. As a result, telescopic travel of the inner column and tightening retention by the outer column can be sufficiently secured within the limited length of the outer column in the axial direction.

In the fourth invention, by inserting a knock pin mounted on the outer column into telescoping-enabling long holes formed on both sides of the inner column in a width direction, rotation of the inner column with respect to the outer column can be regulated and vertical slip can be prevented. Furthermore, the knock pin can be used as a stopper and a slide guide during telescopic adjustment.

BRIEF DESCRIPTION OF THE DRAWINGS

4B is an enlarged view of section (β) in FIG. 4A prior to deformation of the inner column.

DESCRIPTION OF THE PREFERRED EMBODIMENT

Hereinafter, an embodiment of the present invention will be described with reference to the drawings. Moreover, in the present invention, front and rear directions are set in the description below, wherein a side corresponding to the front of an automobile is designated a "front side" and a side corresponding to the rear the automobile is designated a "rear side" with reference to the front and rear directions of the automobile in a state where a steering apparatus according to the present invention is mounted to the automobile. In addition, a direction that connects the front side and the rear side will be referred to as an "axial direction". Furthermore, a "width direction" represents a left-right direction of the automobile.

As shown in FIGS. 1 and 3, the present invention primarily comprises a fixing bracket 1, an inner column 2, an outer column A, a pivot bracket 4, a tightener 6, and the like. First, the fixing bracket 1 comprises fixing side sections 11 and mounting sections 12 formed on both sides in the width direction, and a coupling section 15. Horizontal mounting sections 12 are formed so as to extend outward from upper ends of the respective fixing side sections 11. The mounting sections 12 are formed coupled to each other by the coupling section 15 so as to constitute an integral structure.

Figure 3A:
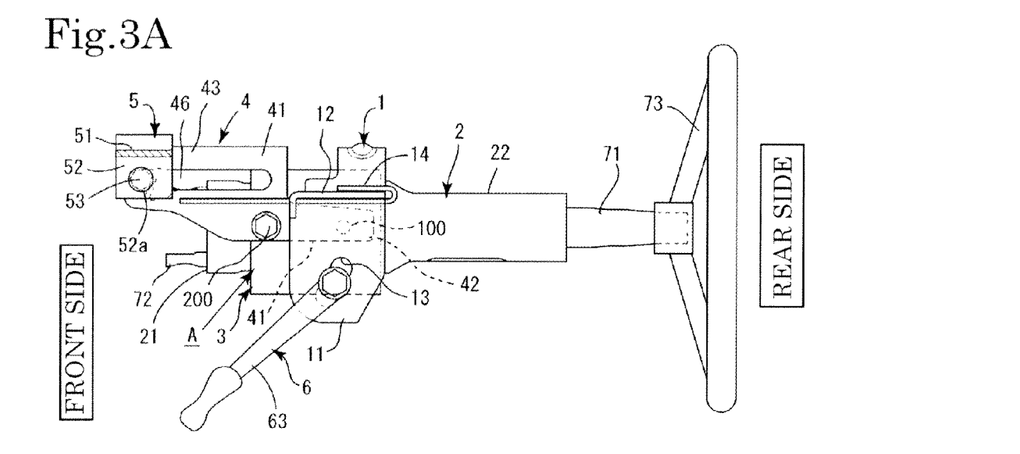
FIG. 3A is a side view of the present invention.
Figure 3B:
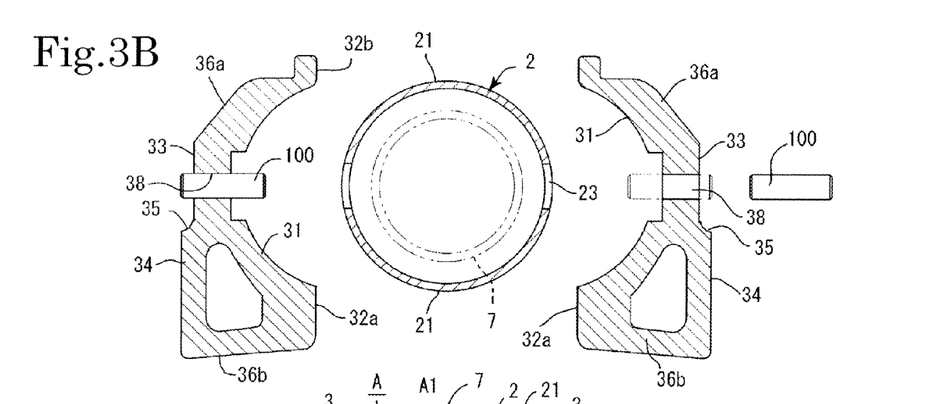
FIG. 3B is a longitudinal front view of an inner column and an outer column.

Long holes 13 for tilt adjustment with a lengthwise direction that is a vertical direction or a longitudinal direction are formed in the fixing side sections 11 (refer to FIG. 3A). Capsule members 14 are respectively mounted on top of the two mounting sections 12, and the fixing bracket 1 is mounted to a predetermined location of a vehicle body via the two capsule members 14 (refer to FIGS. 1A and 1B).

Figure 1A:
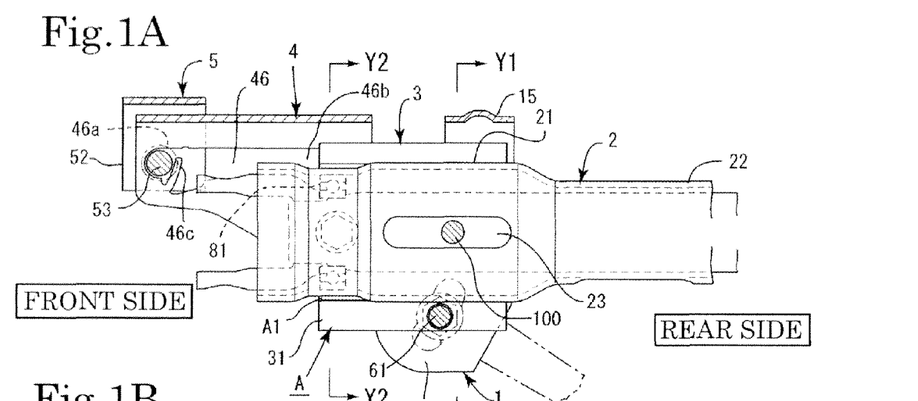
FIG. 1A is a partially-sectional side view of substantial parts of the present invention.
Figure 1B:
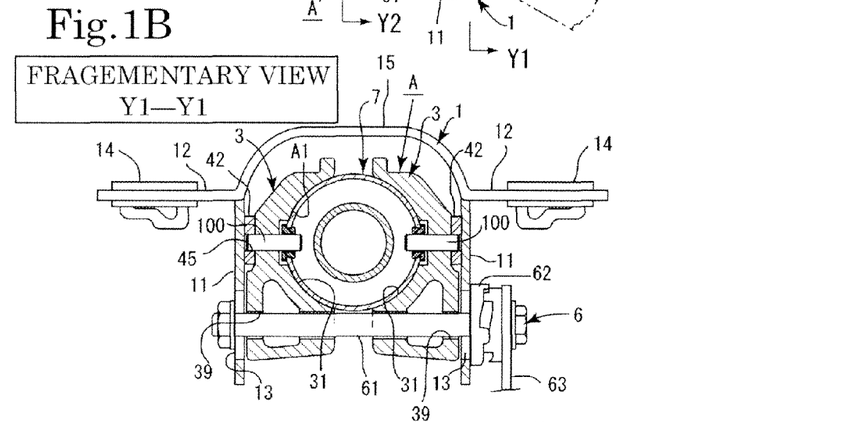
FIG. 1B is a fragmentary sectional view taken in the direction of Y1-Y1 in FIG. 1A.
Figure 1C:
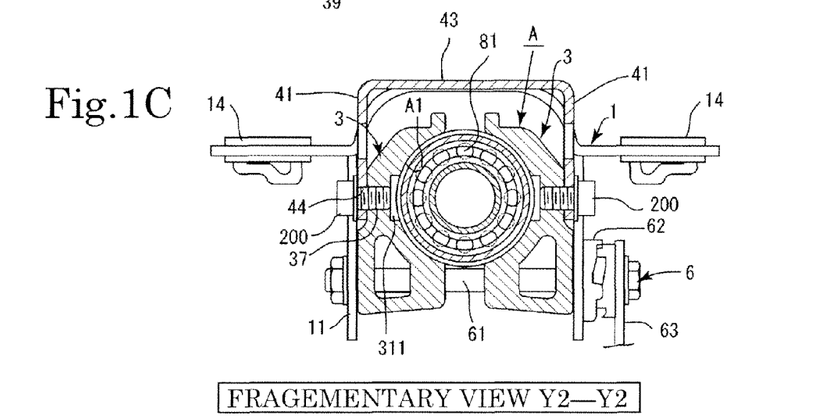
FIG. 1C is a fragmentary view taken in the direction of Y2-Y2 in FIG. 1A.
Figure 2A:
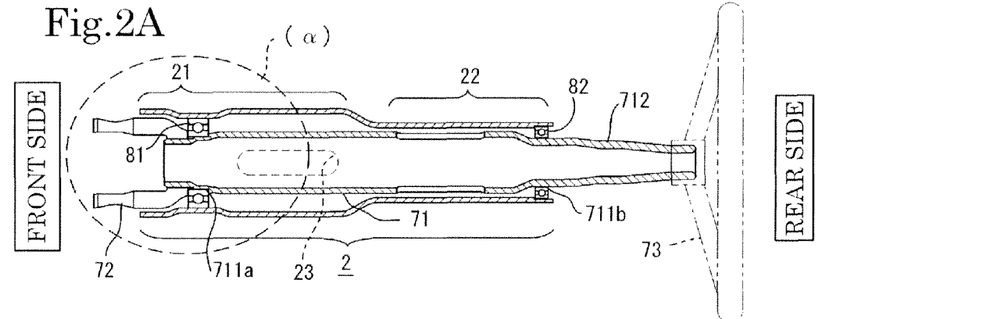
FIG. 2A is a longitudinal side view of an inner column and a steering shaft.
Figure 2B:
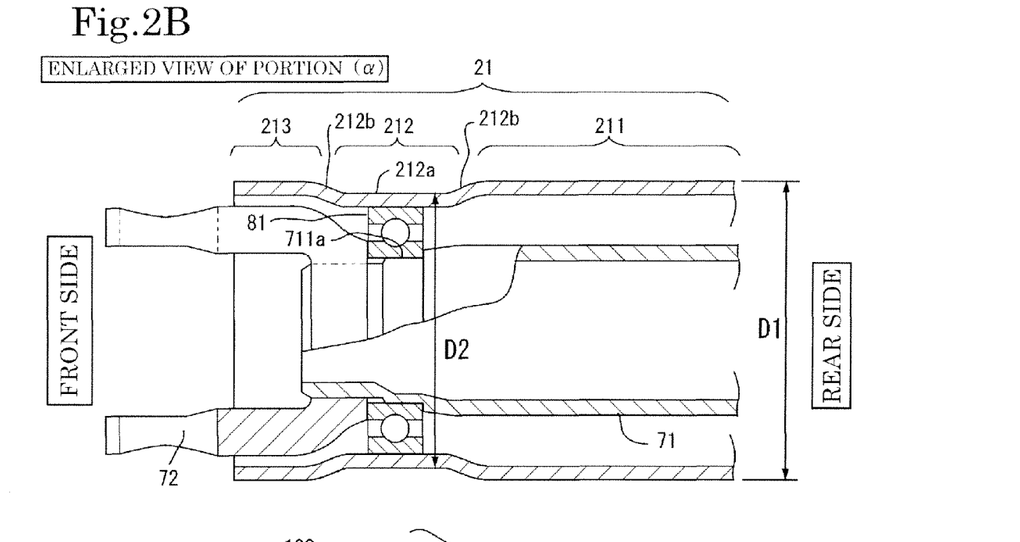
FIG. 2B is an enlarged view of portion (α) in FIG. 2A.

The inner column 2 is a hollow cylindrical pipe (tube) and rotatably supports a steering shaft 7 using a front-side bearing 81 and a rear-side bearing 82 (refer to FIGS. 1, 2A, and 2B). The inner column 2 comprises an embraced cylindrical section 21 and a cylinder main body section 22. The embraced cylindrical section 21 is a region where the inner column 2 has a maximum outer diameter in the axial direction, and the cylinder main body section 22 is a region formed so as have a narrower outer diameter than the embraced cylindrical section 21 (refer to FIG. 2A).

The cylinder main body section 22 is formed by drawing or the like on the rear side of the embraced cylindrical section 21 in the axial direction. The embraced cylindrical section 21 is formed so as to have a main cylindrical section 211, a relief section 212, and a yoke housing cylindrical section 213 in this order from the rear side to the front side in the axial direction. In other words, the relief section 212 is formed in a middle region of the embraced cylindrical section 21 in the axial direction, the main cylindrical section 211 is formed on the rear side of the relief section 212, and the yoke housing cylindrical section 213 is formed on the front side of the relief section 212 (refer to FIGS. 2A and 2B).

With the exception of the relief section 212, portions of the embraced cylindrical section 21 have the same outer diameter. In other words, the main cylindrical section 211 and the yoke housing cylindrical section 213 have the same outer diameter. The relief section 212 is a portion which is formed such that an outer diameter D2 thereof is smaller than an outer diameter D1 of the other portions of the embraced cylindrical section 21 and which has a circumferential groove shape or a circumferential constricted shape along a circumferential direction of the embraced cylindrical section 21 (refer to FIG. 4). Therefore, an inner diameter of the relief section 212 is formed smaller than an inner diameter of the other portions of the embraced cylindrical section 21. In addition, the outer diameter D2 of the relief section 212 is larger than an outer diameter of the cylinder main body section 22.

While the relief section 212 is a portion formed in the middle region of the embraced cylindrical section 21 in the axial direction, the relief section 212 is favorably formed in the middle region at a position toward the front side in the axial direction. In the axial direction of the embraced cylindrical section 21, the main cylindrical section 211 has the greatest length and a length of the relief section 212 is slightly greater than or approximately equal to a length of the yoke housing cylindrical section 213. The relief section 212 comprises a circumferential bottom surface 212a and conical slopes 212b. The conical slopes 212b are formed on both sides of the circumferential bottom surface 212a in the axial direction (refer to FIG. 2B).

The front-side bearing 81 is press-fitted and fixed to an inner circumferential side of the circumferential bottom surface 212a (refer to FIGS. 2A and 2B). The two conical slopes 212b are portions formed during the process of drawing so as to have a cross-sectional shape along the axial direction which is sloped with respect to the axial direction. The conical slopes 212b of the relief section 212 are intended to absorb distortion due to a minute deformation of the embraced cylindrical section 21 when the inner column 2 is subjected to a tightening force in a diametrical direction and to provide a structure that makes distortion less likely to reach the circumferential bottom surface 212a. Therefore, the conical slopes 212b are favorably gentle slopes that have a small angle of inclination with respect to the axial direction.

A length of the embraced cylindrical section 21 in the axial direction is formed longer than a length of an embracing inner circumferential surface A1 of the outer column A, which will be described later. In addition, a length of the main cylindrical section 211 is formed approximately the same or slightly smaller than the length of the embracing inner circumferential surface A1 of the outer column A in the axial direction (refer to FIGS. 1A, 4, and 5).

A yoke section 72 of the steering shaft 7, which will be described later, is housed in and enclosed by the yoke housing cylindrical section 213. An outer diameter of the yoke housing cylindrical section 213 is formed in a size with a certain amount of clearance so as to prevent interference with the yoke section 72 (refer to FIGS. 2A and 2B). Telescoping-enabling long holes 23 having a lengthwise direction that is parallel to the axial direction are formed on both sides of the embraced cylindrical section 21 in the width direction.

The outer column A has an embracing inner circumferential surface A1 that embraces the embraced cylindrical section 21 of the inner column 2 so as to enable telescopic adjustment. The embracing inner circumferential surface A1 is formed so as to have a same diameter along the axial direction. An embodiment will now be described in which the present invention is applied to a steering apparatus having an outer column A comprising a pair of column half bodies 3

(refer to FIGS. 1B, 1C, 2C, and 3B). The two column half bodies 3 have a same shape and are arranged opposing each other so as to form a left-right symmetrical shape. Each of the column half bodies 3 is made of an aluminum alloy by casting, extrusion molding, or the like.

Among the two column half bodies 3, sides that oppose each other are designated inner sides and outer circumferential portions other than the inner sides are designated outer sides. An embracing semicircular section 31 that constitutes the embracing inner circumferential surface A1 is formed on the inner side of each of the column half bodies 3. In a state in which the pair of column half bodies 3 are arranged so as to be left-right symmetrical, the two embracing semicircular sections 31 constitute the embracing inner circumferential surface A1 that is a circular through hole penetrating in the axial direction, and embraces the embraced cylindrical section 21 of the inner column 2. A recess 311 is formed at a central position in a vertical direction of the embracing semicircular section 31 along the axial direction.

Moreover, on the inner side of the column half body 3, a surface below the embracing semicircular section 31 is designated a lower inner surface 32a and a surface above the embracing semicircular section 31 is designated an upper inner surface 32b. The lower inner surface 32a and the upper inner surface 32b are formed as vertical flat surfaces. In addition, the lower inner surface 32a and the upper inner surface 32b are arranged so that appropriate spacing exists between the two respective lower inner surfaces 32a and the two respective upper inner surfaces 32b when the pair of column half bodies 3 are arranged so as to be left-right symmetrical to constitute the outer column A and the embraced cylindrical section 21 of the inner column 2 is sandwiched by the two column half bodies 3 (refer to FIGS. 2C and 3B).

Figure 2C:
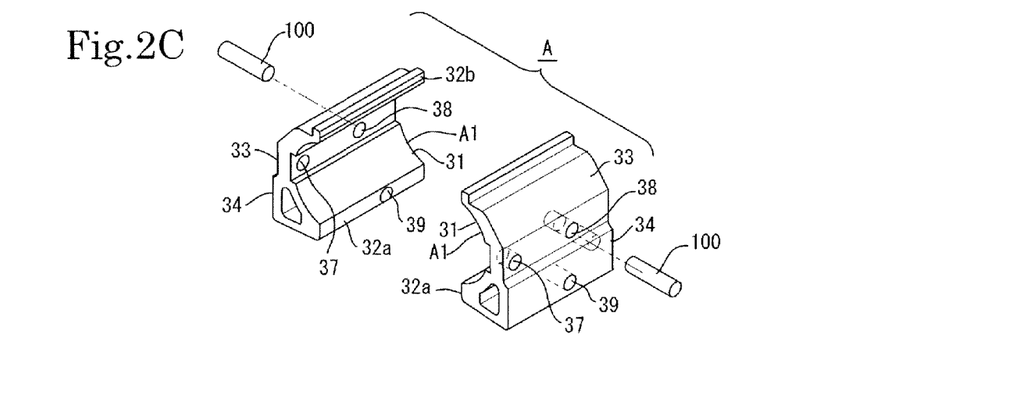
FIG. 2C is an exploded perspective view of an outer column and a knock pin.

An upper abutting surface 33 and a lower abutting surface 34 are formed on the outer side of the column half body 3 (refer to FIG. 2C). A screw hole 37 and a knock pin mounting hole 38 which penetrate the inner-side embracing semicircular section 31 and the outer-side upper abutting surface 33 are formed in the column half body 3. The screw hole 37 is formed on the front side and the knock pin mounting hole 38 is formed on the rear side. In addition, an inner screw is formed in the screw hole 37. The lower abutting surface 34 is a vertical flat surface which has an approximately rectangular shape below the upper abutting surface 33 and which is parallel to the upper abutting surface 33. A tightening bolt shank insertion hole 39 into which a bolt shank 61 of the tightener 6 (to be described later) is inserted is formed on the lower abutting surface 34.

The steering shaft 7 comprises a shaft section 71 and a yoke section 72. The shaft section 71 is shaped as a hollow pipe (tube) and comprises a thick tube section 711 housed inside the inner column 2 and a narrow diameter section 712 that protrudes from the inner column 2. A bearing mounting section 711a is provided on a front side end section and a bearing mounting section 711b is provided on a rear side end section of the thick tube section 711 (refer to FIG. 2A).

The front-side bearing 81 that is mounted to the front-side bearing mounting section 711a of the steering shaft 7 is press-fitted and fixed to an inner circumferential side of the relief section 212 of the inner column 2. In addition, the rear-side bearing 82 is mounted to the bearing mounting section 711b of the inner column 2 and is press-fitted and fixed to a rear side end section of the inner column 2. Furthermore, after the bearing 81 is mounted to the bearing mounting section 711a of the shaft section 71, the yoke section 72 is press-fitted and fixed to the front side end section of the shaft section 71.

Pivot side sections 41 are formed at both sides of the pivot bracket 4 in the width direction, and the respective upper ends of the two pivot side sections 41 are formed coupled to each other so as to constitute an integral structure at a pivot upper section 43 (refer to FIGS. 1, 3A, and the like). A rearward-extending side section 42 is integrally formed with the pivot side section 41 so as to protrude rearward from a lower side position of the pivot side section 41. The rearward-extending side section 42 is a portion that abuts the upper abutting surface 33 of the outer column 3 and is formed in a shape that is smaller overall than a region of the upper abutting surface 33.

Along hole section 46 is formed above the pivot side section 41 along the axial direction. The long hole section 46 comprises a tilt retaining hole 46a, a shock absorbing long hole 46b, and a retaining section 46c (refer to FIG. 1A). The tilt retaining hole 46a is positioned at a front side end section of the long hole section 46, and other regions of the long hole section 46 are used as the shock absorbing long hole 46b. The retaining section 46c is a portion for partitioning the respective regions of the tilt retaining hole 46a and the shock absorbing long hole 46b from each other. Specifically, the retaining section 46c is a shaft-like piece member formed so as to protrude upward from a lower end or downward from an upper end of an inner circumferential edge of the long hole section 46.

A pivot shaft 53 (to be described later) is inserted into the tilt retaining hole 46a. When an impact occurs due to a collision or the like, the pivot shaft 53 (to be described later) knocks down and breaks the shaft-like piece retaining section 96c and causes the long hole section 46 to move forward. A fixing bolt insertion hole 94 is formed below the pivot side section 41 and a knock pin insertion hole 45 is formed in the rearward-extending side section 42.

The lower fixing bracket 5 is fixed to the vehicle body, and the pivot bracket 4 is coupled to the lower fixing bracket 5 so as to be rotationally movable (refer to FIGS. 1A and 3). The lower fixing bracket 5 comprises pivotally-supporting coupling side sections 52 formed at both sides of the lower fixing bracket 5 in the width direction and a mount fixing section 51 provided so as to extend outward in the width direction from upper ends of the pivotally-supporting coupling side sections 52. A supporting hole section 52a is formed in the pivotally-supporting coupling side sections 52.

In addition, a fixing hole (not shown) for mounting the mount fixing section 51 to a predetermined location of the vehicle body is formed in the mount fixing section 51. The two pivotally-supporting coupling side sections 52 sandwich the two pivot side sections 41 of the pivot bracket 4, and the respective pivotally-supporting coupling side sections 52 and the pivot side sections 41 are pivotally supported and coupled by the pivot shaft 53. The pivot shaft 53 is inserted into the supporting hole section 52a of the pivotally-supporting coupling side section 52 and is coupled to the pivot side section 41 by being inserted into the tilt retaining hole 46a. The tightener 6 comprises a bolt shank 61, a tightening cam 62, and an operating lever section 63 (refer to FIGS. 1A and 3).

A knock pin 100 is press-fitted into the knock pin mounting hole 38 formed between the embracing semicircular section 31 and the upper abutting surface 33 of the respective column half bodies 3 of the outer column A. The knock pin 100 is press-fitted and fastened so as to protrude from respective surfaces of the upper abutting surface 33 and the embracing semicircular section 31. On the side of the embracing semicircular section 31, a tip of the knock pin 100 protrudes from the recess 311 to the inside of an arc of the embracing semicircular section 31.

The embraced cylindrical section 21 of the inner column 2 is sandwiched by the embracing semicircular sections 31 of the two column half bodies 3. The knock pins 100 that protrude from the embracing semicircular sections 31 of the two column half bodies 3 are respectively inserted into telescoping-enabling long holes 23 formed on the inner column 2 at both sides in the width direction (refer to FIGS. 1B and 3B).

With the inner column 2 sandwiched between the two column half bodies 3 of the outer column A, a rotation in a direction circumferential to the axis is regulated and a slip in a vertical direction is suppressed by inserting the knock pin 100 into the telescoping-enabling long hole 23 (refer to FIG. 1B). In addition, by having the knock pin 100 and an end section of the telescoping-enabling long hole 23 in the axial direction abut each other, a stroke range during telescopic adjustment can be regulated.

Furthermore, the inner column 2 is capable of moving in the axial direction along the knock pin 100 inserted into the telescoping-enabling long hole 23 so as to guide the movement of the inner column 2 in the axial direction during telescopic adjustment. A slide guide made of resin or the like may be mounted to the telescoping-enabling long hole 23.

The embraced cylindrical section 21 of the inner column 2 is formed such that an inner diameter of the embraced cylindrical section 21 is larger than the inner diameter of other portions. Therefore, the steering shaft 7 mounted into the inner column 2 and the knock pin 100 do not come into contact and interfere with each other.

The upper abutting surfaces 33 of the two column half bodies 3 of the outer column A are sandwiched by the two rearward-extending side sections 42 of the pivot bracket 4. An outward side tip of the knock pin 100 that protrudes from the upper abutting surface 33 is inserted into the knock pin insertion hole 45. The respective rearward-extending side sections 42 abut the upper abutting surfaces 33 in approximate surface contact.

A screw shaft section of a fixing bolt 200 is then inserted into screw holes 37 formed on the two upper abutting surfaces 33 and the two fixing bolt insertion holes 44 of the pivot bracket 4, tightened by the inner screw of the screw holes 37 of the outer column A, and coupled and fixed in a state in which the pivot bracket 4 is sandwiching the outer column A (refer to FIGS. 1C and 3).

The two fixing side sections 11 of the fixing bracket 1 sandwich the rearward-extending side sections 42 of the pivot bracket 4 fixed to the two upper abutting surfaces 33 of the outer column A and the lower abutting surfaces 34, and the bolt shank 61 of the tightener 6 penetrates the tightening bolt shank insertion hole 39 of the outer column A and the tilt adjustment long holes 13 of the fixing bracket 1 (refer to FIG. 1B). In addition, the two pivot side sections 41 of the pivot bracket 4 in the width direction are supported by the lower fixing bracket 5 (refer to FIGS. 1A and 3A).

Figure 4A:
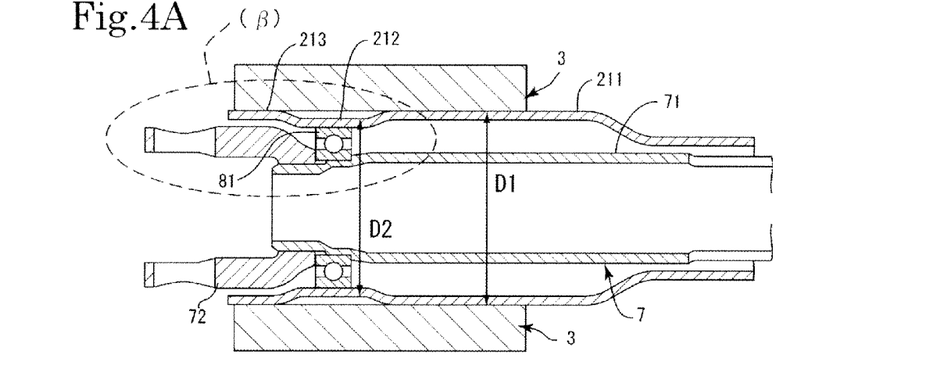
FIG. 4A is a cross-sectional plan view that presents a simplification of a configuration demonstrating an operation in a tightened state according to the present invention, FIG.
Figure 4B:
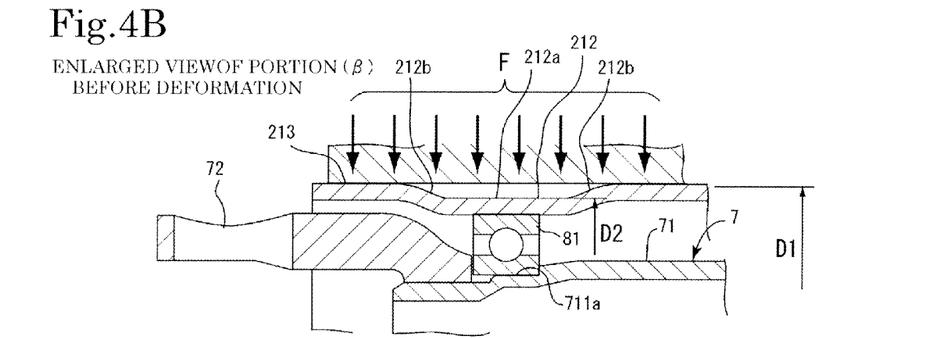
Figure 4C:
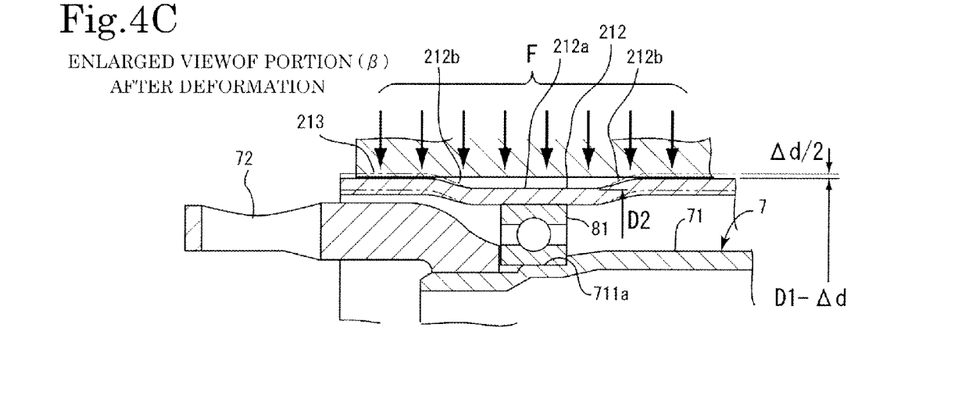
FIG. 4C is an enlarged view of section (β) in FIG. 4A after deformation of the inner column.
Figure 5A:
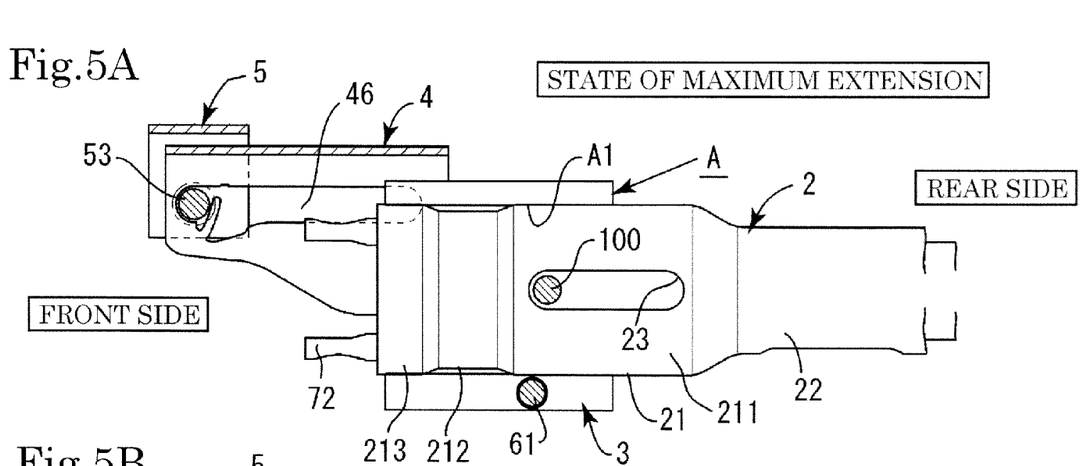
FIG. 5A is a schematic side view of a state of maximum extension during telescopic adjustment.

Next, operations of the present invention will be described with reference to FIG. 4. FIG. 4A is a cross-sectional plan view showing, in a simplified manner, a state in which the inner column 2 is embraced by the two column half bodies 3 of the outer column A. In other words, FIG. 4A is a diagram simply showing a state in which the inner column 2 is sandwiched by the column half bodies 3 of the outer column A and a pressing force F is applied to the inner column 2. FIG. 4B is an enlarged view of portion (β) in FIG. 4A and is a diagram showing a state in which the pressing force F of the column half body 3 is applied centered at the relief section 212 of the embraced cylindrical section 21 of the inner column 2. FIG. 4C is an enlarged view of portion (β) in FIG. 4A and is a diagram showing a state in which the inner column 2 has deformed due to the pressing force F of the column half body 3.

Due to a tightening operation of the operating lever 63 of the tightener 6, the column half bodies 3 of the outer column A approach the inner column 2 together with the fixing side sections 11 of the fixing bracket 1 and the embraced cylindrical section 21 of the inner column 2 is tightened in a diametrical direction. At this point, due to the two column half bodies 3 pressing the embraced cylindrical section 21 with the pressing force F, the outer diameter D1 of the main cylindrical section 211 and the yoke housing cylindrical section 213 of the embraced cylindrical section contracts by a minute dimension Δd.

In FIG. 4C, since pressing takes place from both sides in the diametric direction of the outer diameter D1 of the embraced cylindrical section 21 of the inner column 2, (Δd/2) is described as an amount of contraction of one of the sides. Therefore, due to the pressing force F from the two column half bodies 3, the outer diameters of the inner column 2, the main cylindrical section 211, and the yoke housing cylindrical section 213 in a diametric direction become D1-Δd.

However, since an outer circumferential surface at the relief section 212 is a portion not in contact with the embracing semicircular section 31 of the column half body 3, the relief section 212 is not subjected to the pressing force F from the embracing semicircular section 31. Furthermore, the conical slope 212b is formed in the relief section 212 and the pressing force F from the embracing semicircular section 31 is absorbed by the conical slope 212b. Therefore, deformation is concentrated in the portion of the conical slope 212b and the outer diameter D2 of the circumferential bottom surface 212a remains virtually unchanged (refer to FIGS. 4B and 4C)

Therefore, the outer wheel of the bearing 81 mounted to the inner circumferential side of the relief section 212 is hardly affected by the pressing force F from the column half body 3 and deformative distortion does not occur. Therefore, the bearing 81 is capable of rotating the steering shaft 7 in a smooth manner even in a tightened state created by the tightener 6.

The embraced cylindrical section 21 of the inner column 2 is embraced by the embracing inner circumferential surface A1 of the outer column A, and moves in the axial direction together with the steering shaft 7 during telescopic adjustment. At maximum telescopic extension, the main cylindrical section 211 of the inner column 2 and the yoke housing cylindrical section 213 abut, and are held by, the embracing semicircular sections 31 of the column half bodies 3 (refer to FIG. 5A).

Figure 5B:
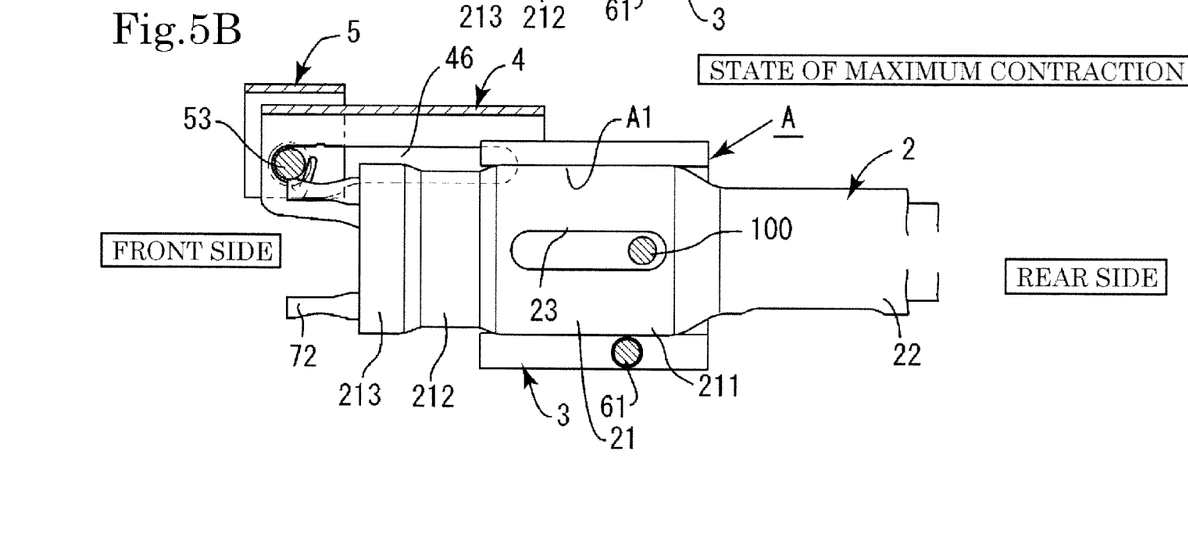
FIG. 5B is a schematic side view of a state of maximum contraction during telescopic adjustment.

In addition, at maximum telescopic contraction, the entire region of the main cylindrical section 211 of the inner column 2 abuts, and is embraced by, the embracing semicircular sections 31 of the column half bodies 3 (refer to FIG. 5B). Accordingly, a state is maintained in which the embraced cylindrical section 21 of the inner column 2 abuts the entire region of the embracing inner circumferential surface A1 of the outer column A both during maximum telescopic extension and maximum telescopic contraction. As a result, a tightened state can be stabilized and tightening rigidity can be improved. Furthermore, an amount of travel of the inner column 2 in the axial direction with respect to the embracing inner circumferential surface A1 of the outer column A during telescopic adjustment can be secured.

In addition, an embodiment of the outer column A may be adopted in which the column half bodies are integrally formed.

Figure 3C:
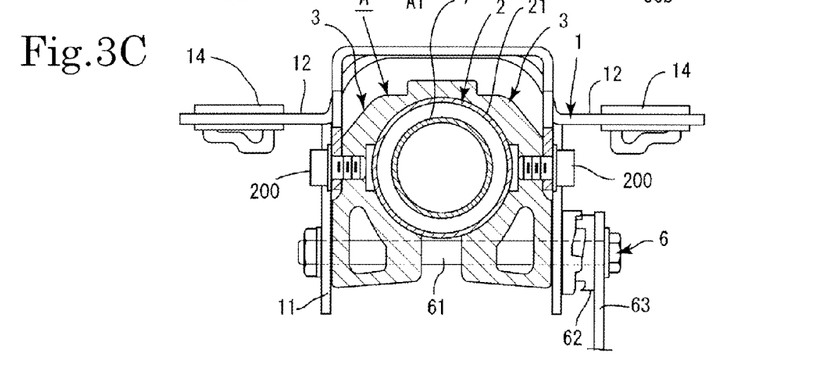
FIG. 3C is longitudinal front view of the present invention in which an outer column according to another embodiment of the present invention is used.

Specifically, a structure coupled at upper parts of the two column half bodies is realized, wherein the embracing inner circumferential surface A1 is constituted by the respective embracing semicircular sections 31 (refer to FIG. 3C). By integrally forming the column half bodies 3 in this manner, the stiffness of the outer column A increases and the number of parts is reduced. In addition, slip and rotation of the inner column 2 can be further prevented.

While a steering apparatus in which an outer column A and a pivot bracket 4 are coupled and fixed by a knock pin 100 and a fixing bolt 200 has been described by way of example, the present invention can also be applied to a steering apparatus in which the outer column A and the pivot bracket 4 are integrally molded by casting or the like. The present invention should not be considered as being limited to the embodiment described above, and various changes and modifications can be made to the embodiment.

What is claimed is:

1. A steering apparatus comprising:
a steering shaft comprising a shaft section and a yoke section;
an inner column which supports the steering shaft via a bearing;
an outer column which embraces the inner column and which includes an embracing inner circumferential surface with a same diameter along an axial direction;
a fixing bracket which includes fixing side sections sandwiching both sides of the outer column in a width direction; and
a tightener which tightens and releases the outer column together with the fixing bracket,
wherein the inner column comprises an embraced cylindrical section that is embraced by the outer column,
wherein the embraced cylindrical section comprises a main cylindrical section, a relief section, and a yoke housing cylindrical section formed from a rear side to a front side in the axial direction, respectively,
wherein an outer diameter of the relief section is less than an outer diameter of the main cylindrical section and less than an outer diameter of the yoke housing cylindrical section,
wherein the diameter of the main cylindrical section is formed substantially equal to the diameter of the yoke housing cylindrical section, and
wherein the bearing that pivotally supports the steering shaft is fixed to an inner circumferential side of the relief section.

2. The steering apparatus according to claim 1, wherein both sides of the relief section in the axial direction are arranged as conical slope sections.

3. The steering apparatus according to claim 2, wherein a telescoping-enabling long hole is formed in the embraced cylindrical section, and a knock pin that protrudes from the embracing inner circumferential surface is mounted on the outer column and inserted into the telescoping-enabling long hole.

4. The steering apparatus according to claim 2, wherein the inner column comprises a cylinder main body section.

5. The steering apparatus according to claim 4, wherein the outer diameter of the cylinder main body section is less than an outer diameter of the embraced cylindrical section.

6. The steering apparatus according to claim 5, wherein the outer diameter of the relief section is greater than the outer diameter of the cylinder main body section.

7. The steering apparatus according to claim 2, wherein an axial length of the main cylindrical section is greater than an axial length of the relief section and an axial length of the yoke housing cylindrical section.

8. The steering apparatus according to claim 7, wherein the axial length of the relief section is greater than the axial length of the yoke housing cylindrical section.

9. The steering apparatus according to claim 7, wherein the axial length of the relief section is equal to the axial length of the yoke housing cylindrical section.

10. The steering apparatus according to claim 1, wherein a telescoping-enabling long hole is formed in the embraced cylindrical section, and a knock pin that protrudes from the embracing inner circumferential surface is mounted on the outer column and inserted into the telescoping-enabling long hole.

11. The steering apparatus according to claim 1, wherein the inner column comprises a cylinder main body section.

12. The steering apparatus according to claim 11, wherein the outer diameter of the cylinder main body section is less than an outer diameter of the embraced cylindrical section.

13. The steering apparatus according to claim 12, wherein the outer diameter of the relief section is greater than the outer diameter of the cylinder main body section.

14. The steering apparatus according to claim 1, wherein an axial length of the main cylindrical section is greater than an axial length of the relief section and an axial length of the yoke housing cylindrical section.

15. The steering apparatus according to claim 14, wherein the axial length of the relief section is greater than the axial length of the yoke housing cylindrical section.

16. The steering apparatus according to claim 14, wherein the axial length of the relief section is equal to the axial length of the yoke housing cylindrical section.

* * * * *